(12) United States Patent
Stanje et al.

(10) Patent No.: US 12,545,320 B2
(45) Date of Patent: Feb. 10, 2026

(54) CONTROL ELEMENT AND VEHICLE WITH CONTROL ELEMENT

(71) Applicant: TDK Electronics AG, Munich (DE)

(72) Inventors: Bernhard Stanje, Graz (AT); Andreas Pentscher-Stani, Leibnitz (AT); Johannes Burger, Deutschlandsberg (AT)

(73) Assignee: TDK ELECTRONICS AG, Munich (DE)

( * ) Notice: Subject to any disclaimer, the term of this patent is extended or adjusted under 35 U.S.C. 154(b) by 564 days.

(21) Appl. No.: 17/995,298

(22) PCT Filed: Apr. 9, 2021

(86) PCT No.: PCT/EP2021/059288
§ 371 (c)(1),
(2) Date: Sep. 30, 2022

(87) PCT Pub. No.: WO2021/219343
PCT Pub. Date: Nov. 4, 2021

(65) Prior Publication Data
US 2023/0159100 A1    May 25, 2023

(30) Foreign Application Priority Data
Apr. 27, 2020   (DE) .......................... 102020111405.2

(51) Int. Cl.
*B62D 15/02*       (2006.01)
*B60K 35/10*       (2024.01)
(Continued)

(52) U.S. Cl.
CPC .......... *B62D 15/0205* (2013.01); *B60K 35/10* (2024.01); *B60K 35/25* (2024.01);
(Continued)

(58) Field of Classification Search
CPC .............. B62D 15/0205; B60W 50/16; B60W 2300/36
See application file for complete search history.

(56) References Cited

U.S. PATENT DOCUMENTS 5,083,108 A * 1/1992 Guest ..................... B62K 21/26
340/432
5,874,892 A * 2/1999 Antonellis ............. B60Q 5/003
340/576

(Continued)

FOREIGN PATENT DOCUMENTS

CN       101107146 A      1/2008
CN       102756751 A     10/2012
(Continued)

OTHER PUBLICATIONS

Examination Report in related Japanese Patent Application No. 2022-563918, in Japanese, dated Mar. 19, 2021 (8 pages).
(Continued)

*Primary Examiner* — Chico A Foxx
(74) *Attorney, Agent, or Firm* — NIXON PEABODY LLP

(57) ABSTRACT

A control element for use, for example with a vehicle is disclosed. The control element includes at least one tubular section with a cavity at least partially surrounded by a wall, and a piezoelectric component. The piezoelectric component is arranged in the cavity and generates a haptic signal at at least one partial region of the control element and/or detects the action of pressure on at least one part of the piezoelectric component. Furthermore, the vehicle with the control element is also specified.

14 Claims, 5 Drawing Sheets

(51) Int. Cl.
*B60K 35/25* (2024.01)
*B60K 35/60* (2024.01)
*B60W 50/16* (2020.01)

(52) U.S. Cl.
CPC .............. *B60K 35/60* (2024.01); *B60W 50/16* (2013.01); *B60W 2300/36* (2013.01)

(56) References Cited

U.S. PATENT DOCUMENTS

| | | | |
|---|---|---|---|
| 9,280,205 B2* | 3/2016 | Rosenberg | G06F 3/041 |
| 9,908,370 B2* | 3/2018 | Sweney | B62K 23/04 |
| 10,203,755 B2* | 2/2019 | Aono | G06F 3/016 |
| 2002/0189641 A1 | 12/2002 | Sato | |
| 2005/0156483 A1* | 7/2005 | Steckel | H03K 17/964 |
| | | | 310/311 |
| 2008/0023951 A1 | 1/2008 | Al-Samarae et al. | |
| 2008/0037818 A1* | 2/2008 | Ierfone | G10K 11/004 |
| | | | 280/11.221 |
| 2009/0288272 A1 | 11/2009 | Zanella | |
| 2010/0004558 A1* | 1/2010 | Frankhouser | A61B 17/3423 |
| | | | 600/567 |
| 2012/0267221 A1 | 10/2012 | Gohng et al. | |
| 2015/0054637 A1* | 2/2015 | Kim | B60R 16/0232 |
| | | | 340/438 |
| 2016/0185356 A1* | 6/2016 | Di Censo | G01L 5/221 |
| | | | 701/36 |
| 2018/0065551 A1 | 3/2018 | Sweney | |
| 2018/0154932 A1 | 6/2018 | Rakouth | |
| 2019/0003905 A1* | 1/2019 | Yoshida | H10N 30/857 |
| 2019/0009791 A1* | 1/2019 | Hergeth | B60W 50/082 |
| 2019/0196597 A1 | 6/2019 | Rinner | |
| 2020/0039559 A1* | 2/2020 | Aerts | H03K 17/962 |
| 2020/0216136 A1* | 7/2020 | Hara | B60W 30/12 |
| 2020/0277018 A1* | 9/2020 | Harazono | B62J 45/4151 |
| 2021/0216144 A1* | 7/2021 | Hopfer | H02N 2/043 |
| 2021/0247845 A1 | 8/2021 | Kugerl | |
| 2023/0028242 A1* | 1/2023 | Chuang | B60W 30/12 |

FOREIGN PATENT DOCUMENTS

| | | | |
|---|---|---|---|
| DE | 202004001832 U1 | 4/2004 | |
| DE | 202008017833 U1 | 8/2010 | |
| DE | 102016009758 A1 | 3/2017 | |
| DE | 102015118531 A1 | 5/2017 | |
| DE | 102016116763 A1 | 3/2018 | |
| DE | 102017128739 A1 | 6/2018 | |
| DE | 102018120760 A1 | 1/2020 | |
| DE | 102018126473 A1 | 1/2020 | |
| EP | 0856432 A2 | 8/1998 | |
| EP | 1216911 A2 | 6/2002 | |
| JP | S61-87770 U | 6/1986 | |
| JP | S61-118856 U | 7/1986 | |
| JP | H07-33066 A | 2/1995 | |
| JP | 2000-228126 A | 8/2000 | |
| JP | 2007-022340 A | 2/2007 | |
| JP | 2010-149644 A | 7/2010 | |
| JP | 4640009 B2 * | 3/2011 | |
| JP | 2012027816 A * | 2/2012 | ............ B60K 28/02 |
| JP | 2015-054564 A | 3/2015 | |
| JP | 2019-053963 A | 4/2019 | |
| JP | 2019-117182 A | 7/2019 | |
| JP | 2019127152 A * | 8/2019 | |
| JP | 2019-530111 A | 10/2019 | |
| TW | M494098 U * | 1/2015 | |
| WO | 2020011403 A1 | 1/2020 | |

OTHER PUBLICATIONS

Examination Report in related Japanese Patent Application No. 2022-563918, in Japanese, dated Oct. 11, 2023 (9 pages).
International Search Report and Written Opinion of International Searching Authority corresponding to International Patent Application No. PCT/EP2021/059288, with English translation of Search Report, mailed Jun. 22, 2021 (10 pages).
Examination Report in related Chinese Patent Application No. 202180031405.X, dated Mar. 14, 2025, in Chinese (7 pages).
Examination Report in European Patent Application No. 21719075.0, dated Nov. 13, 2025, in German (7 pages).
Anonymous: "Piezoelektrischer Sensor - Wikipedia"; Jun. 22, 2021, Seiten 1-4, XP093333564; retrieved from the Internet: URL:https://de.wikipedia.org/wiki/Piezoelektrischer_Sensor; in German (4 pages).

* cited by examiner

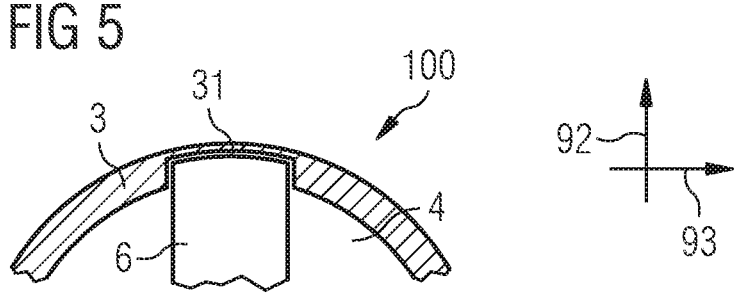
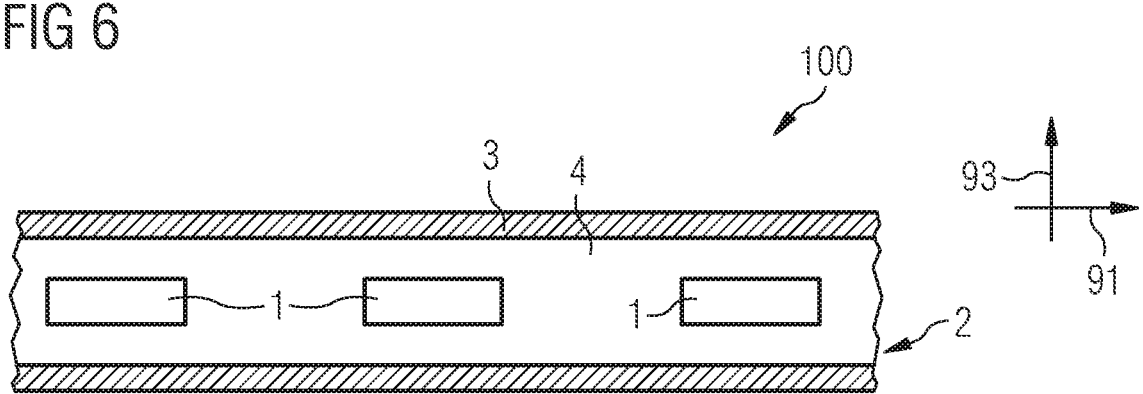
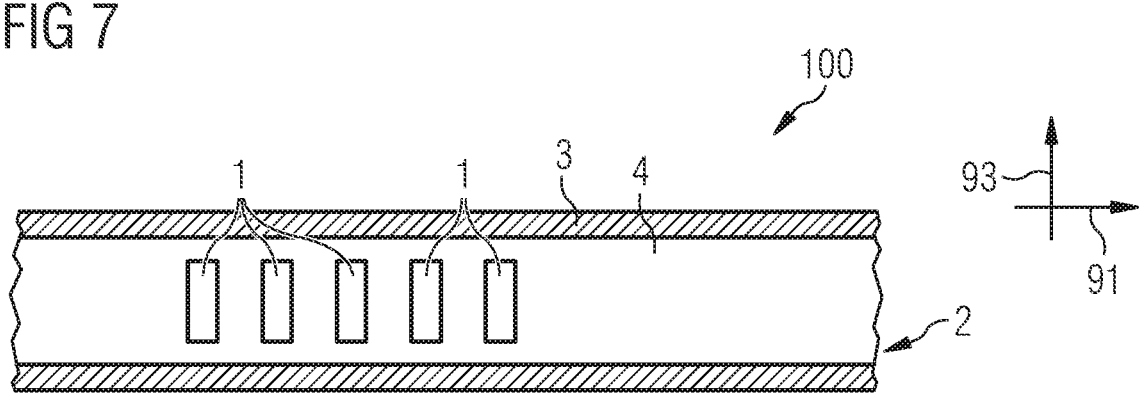

CONTROL ELEMENT AND VEHICLE WITH CONTROL ELEMENT

RELATED APPLICATIONS

This application is a U.S. National Stage of International Application No. PCT/EP2021/059288 filed on Apr. 9, 2021, which claims the benefit of German Patent Application No. 102020111405.2, filed on Apr. 27, 2020, each of which is hereby incorporated by reference in its entirety.

FIELD OF THE INVENTION

A control element and a vehicle with a control element are specified.

BACKGROUND OF THE INVENTION

In order to provide feedback to a vehicle driver in certain driving situations, there are vehicles, such as motor vehicles, whose steering wheel is equipped with a vibration device for generating haptic feedback. The vibration device can, for example, be coupled to a lane assist and embodied in such a way that the steering wheel can provide feedback to the vehicle driver, for example by means of a click or a vibration, when the vehicle leaves its lane, so that the driver can respond accordingly.

So far, so-called linear resonator or unbalanced motor solutions, also known as "linear resonant actuator" (LRA) or "eccentric rotating mass" (ERM), have been used to generate such haptic feedback, which can only generate a predefined vibration.

At least one object of particular embodiments is to provide a control element. At least one further object of particular embodiments is to provide a vehicle with a control element.

These objects are achieved by subject-matters according to the independent patent claims. Advantageous embodiments and developments of the method and the subject-matter are characterized in the dependent claims, and are also disclosed by the following description and the drawings.

SUMMARY OF THE INVENTION

According to at least one embodiment, a control element comprises at least one piezoelectric component. The control element can in particular be an element operated by a user, by means of which haptic feedback and/or input functionality can be enabled. The control element can also be referred to as a so-called human-machine interface (HMI).

According to at least one further embodiment, a vehicle comprises a control element with a piezoelectric component.

The features and embodiments described above and below apply equally to the control element and the vehicle.

According to a further embodiment, the control element has at least one tubular section with a cavity at least partially surrounded by a wall. The piezoelectric component is arranged in the cavity. The piezoelectric component may in particular be provided and embodied to generate a haptic signal at at least a partial region of the control element. In particular, this can mean that a haptic signal can be generated, by means of a suitable electrical activation of the piezoelectric component, for a user of the control element who, for example, touches it with a hand or at least partially encloses it. Alternatively or additionally, the piezoelectric component may be provided and arranged to detect an action of pressure on at least a part of the piezoelectric component. In particular, this may mean that an action of pressure on the piezoelectric component, which is exerted for example by the user of the control element, can be converted into an electrical signal.

The control element can, for example, be a control element for a vehicle. Particularly preferably, the control element may be a steering element for a vehicle, in particular a steering element of a vehicle. Alternatively or additionally, the control element may be a brake element, for example a brake lever, and/or a gear selection element, for example a gearshift or a gear shift lever. Furthermore, the control element may be an input component, for example a pen-type input component, which may further be used, for example, in connection with a display component, for example in a vehicle.

The piezoelectric component may be connected to a drive component for generating an electrical drive signal for operating the piezoelectric component and/or for detecting an electrical signal generated by the piezoelectric component. The drive component, for example in the form of a control unit of the vehicle or at least a part thereof in the case of a control element for a vehicle, may be completely or partially integrated in the control element. Furthermore, the drive component can also be arranged completely or partially outside the control element and connected to the piezoelectric component, for example, via electrical lines that extend into the control element and run within it.

According to a further embodiment, the control element is embodied as a steering element for a vehicle and comprises a steering rod or is a steering rod that has the tubular section. In this case, the vehicle can preferably be a conventionally or electrically operated motorcycle, such as a motorcycle, a so-called trike or a so-called quad. Furthermore, the vehicle may be a bicycle, for example a so-called e-bike or also a conventional bicycle. The steering rod, which may also be referred to as a steering handlebar, may preferably be formed at least in the region of the tubular section as a tube and, particularly preferably, substantially completely as a tube. In this context, the steering rod may be straight, slightly bent or formed with bent or kinked sections.

Particularly preferably, the tubular section can be a handle region of the control element, i.e. the region that is enclosed or at least touched by a hand of the user during normal use. In the case of a control element embodied as a steering rod, the handle region can thus be the region that is enclosed or at least touched by a hand of the user, i.e. in particular of the vehicle driver, during normal use. In the case of a motorcycle steering rod, the handle region may also be rotatable. In particular, the steering rod may have two handle regions. Accordingly, the steering rod may also have at least two tubular sections, each having a cavity at least partially surrounded by a wall. In at least one or both of the cavities, a respective piezoelectric component is preferably arranged. Alternatively or additionally, at least one tubular section with at least one piezoelectric component can also be present outside the handle regions.

Alternatively, the control element may be embodied as a steering element for a vehicle and may comprise or be a steering wheel comprising the tubular section. In this case, the vehicle may preferably be a conventionally powered and/or electrically powered motor vehicle such as a passenger car or a truck or other vehicle with a steering wheel. The steering wheel may preferably be formed as a curved tube at least in the region of the tubular section, and particularly preferably substantially completely as a curved tube. In particular, the steering wheel may be substantially circular or at least approximate a circular shape. As already described for the control element in general and for the steering rod, the steering wheel can have one and preferably at least two handle regions which are each enclosed or at least touched by a hand of the user, i.e. in particular of the vehicle driver, during normal use. Accordingly, the steering wheel may also have at least two tubular sections each having a cavity at least partially surrounded by a wall. In at least one or both of the cavities, a respective piezoelectric component is preferably arranged. Alternatively or additionally, at least one tubular section with at least one piezoelectric component may also be present outside the handle regions.

In the following, reference is made to a tubular section of the control element having a cavity with at least one piezoelectric component. The control element can also have more than one tubular section with a cavity with at least one piezoelectric component, as described above by way of example for a control element embodied as a steering element, wherein each of the tubular sections with the respective at least one piezoelectric component can have one or more of the features described below. The tubular sections with the respective at least one piezoelectric component can be of the same or different design and thus have the same or also different functionalities.

The piezoelectric component particularly preferably has a piezoelectric actuator based on a piezoelectric material, in particular a piezoelectric ceramic material or a piezoelectric polymer material. For example, the piezoelectric actuator may be of multilayer construction with a plurality of piezoelectric layers and internal electrodes arranged one on top of another along a stacking direction. Furthermore, the piezoelectric actuator may have a longitudinal direction, which may correspond to the direction with the largest extension. In particular, the longitudinal direction may be perpendicular to the stacking direction.

By applying a suitable electrical signal, the piezoelectric actuator can perform a change of an extension in at least one direction, wherein this change can be part of the haptic signal, which can be passed on to a user directly or indirectly via further components of the piezoelectric component and/ or the control element. When an AC voltage is applied, a periodic change and thus a vibration can be generated. In particular, the change in the extension of the piezoelectric actuator may be caused by at least the d31 effect and may correspond at least to a change in the length of the piezoelectric actuator along the longitudinal direction.

Using a piezoelectric actuator to generate a haptic signal offers significant advantages. A piezoelectric actuator has a short response and decay time. Accordingly, the time and period during which the haptic signal is generated can be very precisely defined and adjusted. Furthermore, by varying the drive signal applied to the piezoelectric actuator, for example in terms of frequency, electrical voltage, pulse sequence and signal type, it is possible to determine the amplitude, frequency and time duration with which the piezoelectric component is driven. Different drive signals can make it possible to generate different haptic signals.

Piezoelectric actuators have a small volume compared to other components for generating a vibration, for example unbalance motors or linear resonators. By using a piezoelectric actuator in the piezoelectric component, it is thus possible to design a component that has a comparatively small space requirement.

The piezoelectric component may further comprise at least one mechanical amplification element attached to the piezoelectric actuator such that the change in length of the piezoelectric actuator along its longitudinal direction moves a portion of the mechanical amplification element in a direction perpendicular to the longitudinal direction.

The amplification element may comprise metal or be made of metal and, particularly preferably, may be a metal bracket, for example with two end regions attached to end regions along the longitudinal direction of the piezoelectric actuator and with a middle region between the end regions spaced from the piezoelectric actuator The mechanical amplification element may be attached to the piezoelectric actuator by, for example, an adhesive bond. The metal of the amplification element may be titanium, for example. Titanium may have the advantage that its coefficient of thermal expansion is very similar to the coefficient of thermal expansion of the piezoelectric actuator, so that there is little or no mechanical stress when the temperature changes.

The mechanical amplification element can convert the length change of the piezoelectric actuator caused by the d31 effect into a stroke movement perpendicular to the length change, wherein the direction of the stroke movement can correspond to the stacking direction. The stroke movement may have a much larger amplitude than the length change. For example, the amplitude of the stroke movement may be 5 to 40 times the amplitude of the length change. Thus, by combining the piezoelectric actuator with the amplification element, for example, significantly stronger movements can be produced.

The mechanical amplification element may be free of indentations and have a constant wall thickness. The absence of indentations in the amplification element may allow for ease of fabrication of the amplification element. In alternative embodiments, the amplification element may include at least one indentation that reduces a mechanical resistance to deformation of the mechanical amplification element. In particular, for amplification elements having a thickness where deformations of the amplification element require a lot of force, the use of indentations in the amplification element may be useful as the indentations may facilitate deformation of the amplification element.

In particular, the piezoelectric component may be arranged in the tubular section such that it has a force effect in a radial direction with respect to the tubular section, i.e., perpendicular to a tube axis of the tubular section. In other words, the piezoelectric component may, for example in the case of an embodiment with at least one amplification element described above, be arranged such that the stroke direction runs along a radial direction of the tubular section.

According to a further embodiment, the piezoelectric component is arranged in the tubular section such that the longitudinal direction of the piezoelectric actuator runs along a tube axis of the tubular section. If the tubular section has a curved course, "running along the tube axis" may mean, for example, a tangential approach to the tube axis or to a longitudinal direction of the tubular section. In such an arrangement, which may also be referred to as a longitudinal arrangement, a piezoelectric component may be used that has a linear extent that may be far greater than a diameter of the tubular section.

According to a further embodiment, the piezoelectric component is arranged in the tubular section in such a way that the longitudinal direction of the piezoelectric actuator is transverse to the tube axis of the tubular section. In such an arrangement, also referred to as a transverse arrangement, the longitudinal extent of the piezoelectric component is limited by the diameter of the tubular section. However, this allows several piezoelectric components to be placed close together along the tube axis.

According to another embodiment, a plurality of piezoelectric components is arranged in the tubular section, wherein the piezoelectric components may be the same or different. For example, the plurality of piezoelectric components may be arranged side by side to form an array. For example, each of the piezoelectric components can be read and/or driven separately from the other piezoelectric components. This allows different piezoelectric components to perform different functions. Alternatively, several piezoelectric components can be read out or driven together, so that the functionality can be multiplied compared to a single piezoelectric component.

According to a further embodiment, the control element has at least one interaction element through which a user can cause an action of pressure on the piezoelectric component and/or to which the piezoelectric component can transmit the haptic signal for forwarding to the user. In particular, the piezoelectric component can act on the interaction element by the lifting movement described above. Furthermore, the interaction element can transmit a pressure caused by a user on the interaction element to the piezoelectric component so that the action of pressure can be detected by the piezoelectric component by generating an electrical signal in the piezoelectric component. In this case, the interaction element can form a button that can be actuated by the user, by means of which a specific function can be triggered.

The interaction element may, for example, be in the form of a button or a plunger. In the case of a piezoelectric component having an amplification element as described above, the interaction element may be arranged or attached to the amplification element. The interaction element may be arranged at least partially in an opening in the wall of the tubular section and extend into the cavity. Due to the stroke movement of the piezoelectric component, the interaction element, which in the rest position prior to the stroke movement may be recessed in the opening or may also be arranged protruding from the opening, may be pressed (further) out of the opening and thus cause a perceptible haptic signal for a user. Conversely, the interaction element can protrude from the opening in a rest position and can be pressed by a user in the direction of the piezoelectric component.

Furthermore, the wall can have an interaction region which forms the interaction element or at which a previously described interaction element is arranged within the cavity of the tubular section. In this case, the wall does not have an opening and the transmission of the haptic signal or the action of pressure takes place at least partially via the interaction region of the wall. Thus, the piezoelectric component can exert a force on the interaction region of the wall in the tubular section when generating the haptic signal, either directly or via an interaction element. In this regard, it may be advantageous if the wall in the interaction region has a greater mechanical deformability than in other regions, so that the interaction region may have sufficient flexibility, for example, to transmit a haptic signal to a user. For example, the wall in the interaction region may be thinner than in other regions and/or surrounded by an indentation around the interaction region.

According to a further embodiment, the piezoelectric component is arranged between the interaction element and a back side region of the wall opposite the interaction element as viewed from the piezoelectric component. A support element may be arranged between the piezoelectric component and the back side region of the wall in the cavity of the tubular section. The support element may, for example, have a bearing surface for the piezoelectric component and, on a surface opposite the bearing surface, a support surface which nestles against the back side region. The support element allows the stroke movement of the piezoelectric component to be directed completely in the direction of the interaction element.

Alternatively, it is also possible for the piezoelectric component to be arranged between two interaction elements. The interaction elements can be arranged, in particular in relation to the tube cross section, radially opposite one another.

According to a further embodiment, the control element has a handle element that surrounds the tubular section with the piezoelectric component and that has a plastic that is softer than the wall of the tubular section. For example, at least the tubular section of the control element may comprise a metal. The handle element may comprise or be made of a plastic, for example a rubber, and/or also a metal.

The described invention enables the integration of haptic feedback and/or the integration of functional buttons in a control element. For example, in the case of a control element embodied as a steering element, the integration can take place in the handle region of a steering rod or a steering wheel and serve to enable the driver to be specifically notified or alerted via a tactile or palpable signal, for example in a dangerous situation, when parameters are exceeded or in the case of other messages. Furthermore, the dual functionality of the piezoelectric component can also be used to actively trigger control commands by applying targeted pressure in the handle region.

For the realization of a haptic feedback, in particular in the handle region, the movement of the piezoelectric actuator in the longitudinal or transverse direction relative to the tube axis of the tubular section is preferably used as described above. The amplification element of the piezoelectric component can convert this into an amplified movement in a radial direction, i.e. perpendicular to the longitudinal and transverse directions. This mechanical translation pushes or spreads the tubular section or at least the interaction element apart and is responsible for noticeable haptic feedback. Preferably, the movement can act on an interaction element, for example a plunger, wherein the movement can be transferred to the user. In this way, it can be achieved that the haptic feedback can act substantially locally or preferably only locally in a very defined region of a contact surface to the user.

In contrast to ERM and LRA solutions, the use of the piezoelectric component can enable the use of different drive signals in the form of one or more of the following variable parameters electrical voltage, frequency, signal type, pulse sequence. The variation of the drive signal results in a changed perception by the user, which enables the use of different signals for different functions. The haptic feedback can also only occur locally in a defined region at the contact surface to the user, while conventional solutions can only generate global feedback.

As described above, the use of the piezoelectric component also offers the advantage that the piezoelectric component can also be used as a pushbutton in a dual function. By applying pressure to the piezoelectric component, the user can generate an electrical signal that can be used to trigger a defined function, such as switching displays and/or accepting or rejecting calls, as well as other functions.

BRIEF DESCRIPTION OF THE DRAWINGS

Further advantages, advantageous embodiments and further developments are revealed by the embodiments described below in connection with the figures, in which.

FIG. 5 shows a schematic illustration of a control element according to a further embodiment.

FIG. 6 shows a schematic illustration of a control element according to yet a further embodiment.

FIG. 7 shows a schematic illustration of a control element according to another embodiment.

Figure 1A:
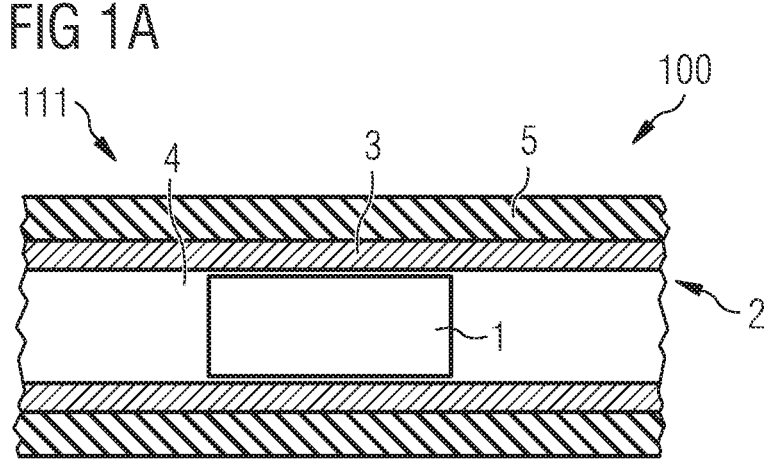
FIG. 1A shows a schematic illustration of an embodiments of a control element.

In the embodiments and figures, identical, similar or identically acting elements are provided in each case with the same reference numerals. The elements illustrated and their size ratios to one another should not be regarded as being to scale, but rather individual elements, such as for example layers, components, devices and regions, may have been made exaggeratedly large to illustrate them better and/or to aid comprehension.

DETAILED DESCRIPTION OF THE DRAWINGS

Figure 1B:
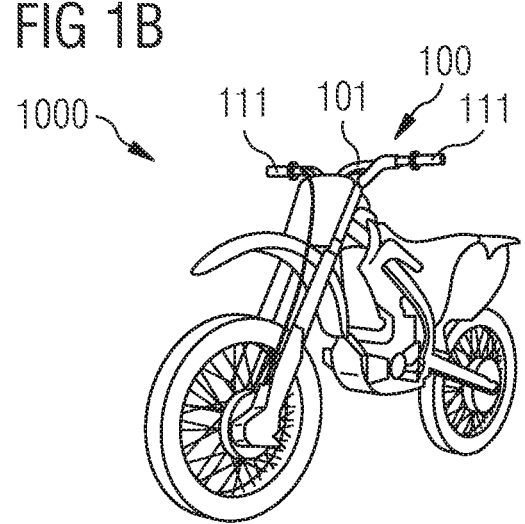
FIG. 1B shows a schematic illustration of an embodiment of a vehicle with a control element.

FIGS. 1A and 1B show embodiments of a control element 100 and a vehicle 1000 having a control element 100. The following description refers equally to FIGS. 1A and 1B.

In the embodiment shown, the vehicle 1000 is a motorcycle. In particular, as shown, it may be a conventionally or electrically powered motorcycle such as a motorcycle. Alternatively, the vehicle may be, for example, a trike, a quad bike, or a bicycle. These types of vehicles typically include a steering rod 101, also referred to as a steering handlebar, as a steering element for steering the vehicle. In the embodiment shown, purely by way of example, the steering element is formed as a control element 100. The steering rod 101 has handle regions 111 which are embraced or at least touched by the hands of a user, i.e. a vehicle driver, during normal use for driving.

As shown in FIG. 1A, the control element 100 has at least one piezoelectric component 1 in a tubular section 2. For this purpose, the control element 100, i.e. in the shown embodiment the steering rod 101 indicated in FIG. 1B, has in the at least one tubular section 2 a cavity 4 at least partially surrounded by a wall 3. The piezoelectric component 1, which is arranged in the cavity 4, is provided and embodied to generate a haptic signal at at least a partial region of the control element 100 and/or to detect an action of pressure on at least a part of the piezoelectric component 1.

The steering rod 101 may preferably be formed as a tube at least in the region of the tubular section 2, and particularly preferably substantially completely as a tube. In this context, the steering rod may be straight or, as indicated in FIG. 1B, slightly bent or formed with bent or kinked sections. Particularly preferably, the tubular section 2 may be the handle portion 111 of the steering rod 101. In the case of the motorcycle steering rod shown, the handle portion may also be rotatable and thus form a rotatable part of the control element 100. Corresponding to the two handle regions 111, the control element 100 may also comprise at least two tubular sections 2 each having a cavity 4 at least partially surrounded by a wall 3. In at least one or in both of the cavities, at least one respective piezoelectric component 1 is preferably arranged. Alternatively or additionally, at least one tubular section 2 with at least one piezoelectric component 1 can also be present outside the handle regions 111.

In the embodiment shown, the control element 100 has a handle element 5 in each of the handle regions 111, which surrounds the tubular section 2 with the piezoelectric component 1 and which preferably has a plastic that is softer than the wall 3 of the tubular section 2. For example, at least the tubular section 2 of the control element 100 may comprise a metal. In particular, the steering rod 101 may comprise a metal. The handle element 5 may comprise or be made of a plastic, for example a rubber, and/or a metal and may be a conventional handle element for a motorcycle or bicycle mounted directly on the steering rod 101.

Figure 2:
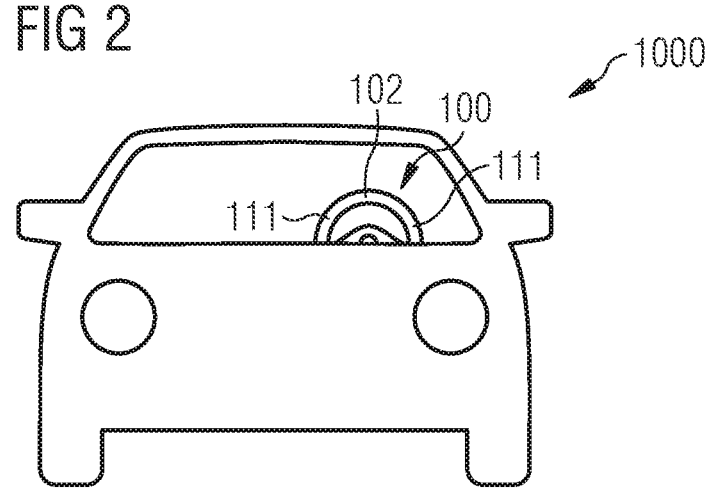
FIG. 2 shows a schematic illustration of another vehicle with a control element according to a further embodiment.

FIG. 2 shows a further embodiment of a vehicle 1000, which is a conventionally and/or electrically powered motor vehicle as compared to the previous embodiment. As indicated in FIG. 2, the vehicle may be a passenger car. Alternatively, a truck or other vehicle is also possible, which, as shown in FIG. 2, has a steering wheel 102 as the control element 100.

The steering wheel 102 has at least one tubular section, which may be formed as explained in connection with FIG. 1A and which has a cavity with at least one piezoelectric component. For example, the steering wheel may be formed as a bent tube at least in the region of the tubular section, and particularly preferably substantially completely as a tube. In particular, the steering wheel may be substantially circular or at least approximate a circular shape. As already described for the steering rod of the preceding embodiment, the steering wheel 102 may, for example, comprise at least two handle regions 111, each of which is enclosed or at least touched by a hand of the user, i.e. in particular of the vehicle driver, during normal use. Accordingly, the steering wheel may also include at least two tubular sections each having a cavity at least partially surrounded by a wall. In at least one or both of the cavities, a respective piezoelectric component is preferably arranged. Alternatively or additionally, at least one tubular section with at least one piezoelectric component may also be present outside the handle regions 111.

By means of the piezoelectric component integrated in the control element 100, a driver of a vehicle 1000 can be specifically notified or alerted via a tactile or palpable signal, for example, in a hazardous situation, when parameters are exceeded, or in the case of other messages. Furthermore, the dual functionality of the piezoelectric component can also actively trigger control commands by applying a targeted pressure.

For the realization of a haptic feedback, in particular in the handle region 111 of the control elements 100 shown in FIGS. 1A to 2, the piezoelectric component can be operated with a suitable drive signal by which the piezoelectric component 100 undergoes a change in expansion as described in the general part, wherein a pressure can be exerted on at least a part of the tubular section. As a result, the tubular section can be for example at least partially spread, which can preferably also be perceived by a user through the handle element. Due to the piezoelectric component, it can be achieved that the haptic feedback can only act locally in a very defined region of a contact surface to the user.

The use of the piezoelectric component makes it possible to use different drive signals in the form of one or more variable parameters, for example voltage, frequency, signal type and/or pulse sequence, which enables the use of different signals for different functions.

By applying pressure to the piezoelectric component, the user can generate an electrical signal that can be used to trigger a defined function, such as switching displays and/or accepting or rejecting calls, as well as other functions.

As an alternative to the control element for a vehicle in the form of a steering element described in the previous embodiments, the control element 100 can also be formed as another element, in particular, for example, as another control element for a vehicle. For example, the control element may be a brake element, for example a brake lever, and/or a gear selection element, for example a gearshift or a gear shift lever. Furthermore, the control element may also be, for example, an input component, for example a pen-type input component, which may further be used, for example, in connection with a display component, for example in a vehicle. In connection with the figures described below, preferred modifications and further embodiments of the control element 100 are described, which may be, for example, as shown, a control element for a vehicle. Elements and features not described or shown may be embodied as described in preceding embodiments.

Figure 3A:
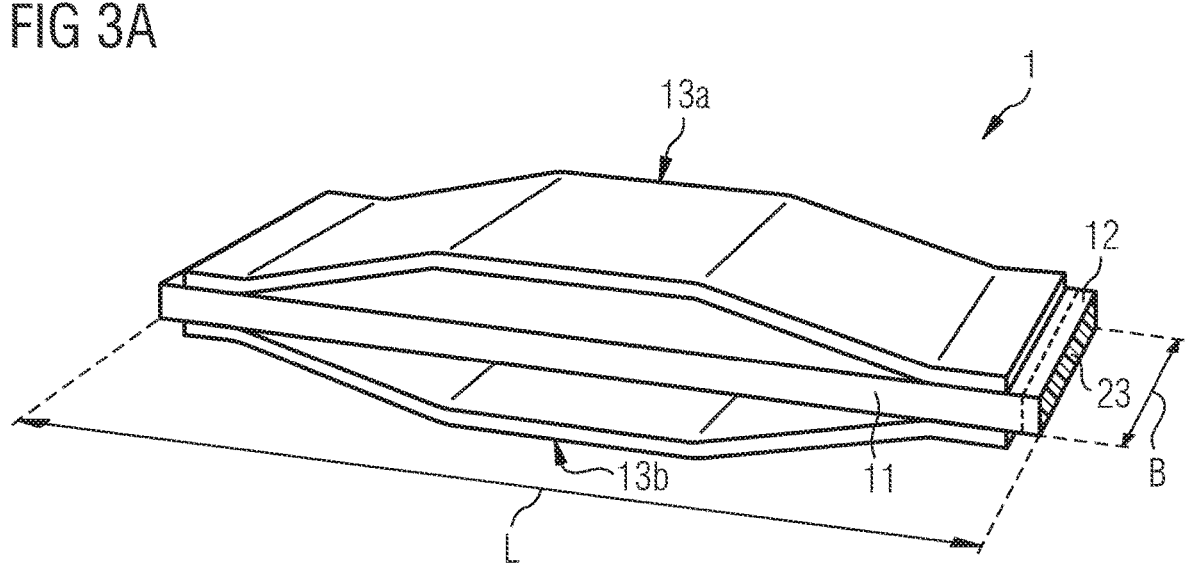
FIG. 3A shows a schematic illustration of a piezoelectric component according to a further embodiment.
Figure 3B:
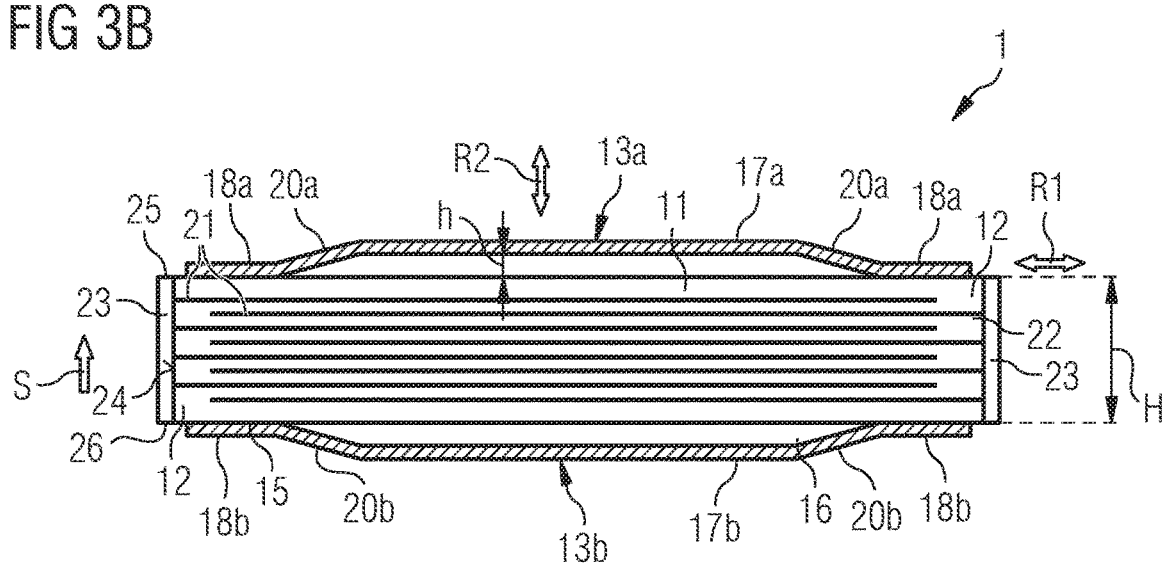
FIG. 3B shows a schematic illustration of the piezoelectric component of FIG. 3A in a sectional view.

FIGS. 3A and 3B show, in a perspective view and a sectional view, a preferred embodiment of a piezoelectric component 1 usable in a control element.

The piezoelectric component 1 has a piezoelectric actuator 11 and two mechanical amplification elements 13a, 13b. The piezoelectric actuator 11 has a stack of internal electrodes 21 and piezoelectric layers 22 alternately stacked in a stacking direction S. The piezoelectric actuator 11 has a first outer electrode 23 disposed on a first end face 24, and a second outer electrode 23 disposed on a second end face. The internal electrodes 21 are alternately contacted with one of the first outer electrodes 23 in the stacking direction S.

The piezoelectric layers 22 may be, for example, lead zirconate titanate (PZT) ceramics. The PZT ceramics may additionally further include Nd and Ni. Alternatively, the PZT ceramic may additionally further comprise Nd, K, and optionally Cu. Alternatively, the piezoelectric layers 22 may have a composition comprising $Pb(Zr_xTi_{1-x})O_3 + y\ Pb(Mn_{1/3}Nb_{2/3})O_3$. As an alternative to a piezoelectric ceramic material, for example a piezoelectric polymer may be used. The internal electrodes 21 preferably comprise copper or are particularly preferably made of copper.

The piezoelectric actuator 11 is preferably cuboid-shaped as shown. The base surface is defined as a surface whose surface normal points in the stacking direction S. The base surface is rectangular. The longer side of the base surface defines the length L of the piezoelectric actuator 11 and the shorter side of the base surface defines the width B of the piezoelectric actuator 11.

The piezoelectric actuator 11 has a length L between 5 mm and 100 mm and a width B between 2 mm and 8 mm. In a particularly preferred embodiment, for example, the piezoelectric actuator 11 has a length L of 60 mm and a width B of 5 mm.

The extent of the piezoelectric actuator 11 in stacking direction S defines the height H of the piezoelectric actuator 11. The height H of the piezoelectric actuator 11 can be between 200 μm and 3 mm in a particularly preferred embodiment, the height H is 1.8 mm.

The actuator 11 has two insulation regions 12. Each of the insulation regions 12 is formed in an end region of the actuator 11. In particular, the respective insulation region 12 is formed in the region of an end face 24 of the actuator 11.

In the insulation region 12, only internal electrodes 21 of one polarity extend to the end face 24 of the actuator 11. The insulation region 12 can be used for contacting the actuator 11. For example, the respective insulation region 12 can be provided with the outer electrodes 23 for electrical contacting.

The actuator 11 is embodied in such a way that when an electrical voltage is applied, a deformation of the actuator 11 takes place, in particular a change in length in the longitudinal direction R1 indicated in FIG. 3B. In particular, the piezoelectric layers 22 are thus polarized in such a way that the application of an electrical voltage between the internal electrodes 21 leads to a contraction of the actuator 11, during which the length L of the actuator 11 changes perpendicularly to the stacking direction S. Consequently, there is an expansion of the actuator transverse to the polarization direction and the electric field, which is also referred to as the d31 effect.

In order to redirect the effect of the change in length in the stacking direction S, the component has two amplification elements 13a, 13b. When a voltage is applied to the actuator 11, the amplification elements 13a, 13b deform at least partially as a result of the change in the extension of the actuator 11. In particular, the two amplification elements 13a, 13b are dimensioned and connected to the actuator 11 in such a way that, as a result of a change in the length L of the actuator 11, a middle region 17a, 17b of each of the amplification elements 13a, 13b executes a stroke movement in the stroke direction R2, as indicated in FIG. 3B, corresponding to the stacking direction S, the amplitude of the stroke movement being greater than the amplitude of the change in the length L of the actuator 11.

As shown, the actuator 11 is preferably arranged between the amplification elements 13a, 13b. The amplification elements 13a, 13b rest at least partially on the upper side 25 and the lower side 26 of the actuator 11, respectively.

Each of the amplification elements 13a, 13b is preferably formed in one piece and is strip-shaped and has a rectangular basic shape. Furthermore, each of the amplification elements 13a, 13b is curved or bent and is bow-shaped. For example, the amplification elements 13a, 13b each have a sheet metal strip or are made from it, in particular, with or from titanium.

Each of the amplification elements 13a, 13b is divided into several regions or sections. Thus, each amplification element 13a, 13b has a middle region 17a, 17b. The middle regions 17a, 17b are connected to respective end regions 18a, 18b via connecting regions 20a, 20b. The two end regions 18a, 18b of each of the amplification elements 13a, 13b rest directly on a surface of the actuator 11. In other words, the first and second end regions 18a of the first amplification element 13a rest on a partial region of the top surface 25 of the actuator 11. Further, the first and second end region 18b of the second amplification element 13b rest on a partial region of the bottom surface 26 of the actuator 11. Preferably, the end regions 18a, 18b are non-detachably connected to the surface of the actuator 11. In particular, the end regions 18a, 18b are connected to the surface of the actuator 11 by an adhesive bond 15.

Each of the middle regions 17a, 17b is spaced from the surface of the actuator 11. In particular, a free region 16 is located between the respective middle region 17a, 17b and the bottom side 26 or the top side 25 of the actuator 11. The free region 16 has a height h. A free height h between the actuator 11 and the respective middle region 17a, 17b is preferably between 0.2 mm and 5.0 mm and, in a particularly preferred embodiment, is about 3 mm, wherein the free height h indicates the maximum distance between the respective middle region 17a, 17b and the piezoelectric actuator 11 when no voltage is applied to the actuator 11 and no external force acts on the amplification element 13a, 13b.

Preferably, the middle regions 17a, 17b are formed to run parallel to the surface of the actuator 11. The connecting regions 20a, 20b run obliquely to the surface of the actuator 11. In other words, the respective connecting region 20a, 20b encloses an angle with the upper side 25 or the lower side 26 of the actuator 11. The angle is preferably less than or equal to 45°. Thus, the height h of the free region 16 decreases in the direction from the middle region 17a, 17b towards the end region 18a, 18b of the respective amplification element 13a, 13b. A total height of the piezoelectric component 1 with the actuator 11 and the two amplification elements 13a, 13b may be about 9 mm in a preferred embodiment.

If an electrical voltage is now applied to the actuator 11, the partial regions 17a, 17b of the respective amplification element 13a, 13b move relative to the actuator 11 in the stroke direction R2. In particular, the middle regions 17a, 17b move in the stroke direction R2. In doing so, the amplification elements 13a, 13b bend at transitions between the middle regions 17a, 17b and the connecting regions 20a, 20b and between the connecting regions 20a, 20b and the end regions 18a, 18b. The amplification elements 13a, 13b can have at least one thinning, preferably several thinnings, between the respective regions, which allow better deformability of the amplification elements 13a, 13b and easier execution of the stroke movement. Furthermore, the amplification elements 13a, 13b can have, for example, embossed structures to increase the strength of individual regions.

Movement of the end regions 18a, 18b in the stroke direction R2 is prevented by the adhesive bond 15 to the actuator 11. Instead, the end regions 18a, 18b move with the actuator 11 in the longitudinal direction R1. Thus, a relative movement takes place between the end regions 18a, 18b and the middle regions 17a, 17b. In a preferred embodiment, a total stroke movement of about 200 μm can be achieved when an electrical voltage of up to 120 V is applied.

If a force is applied to the piezoelectric component 1 along the stroke movement R2, the amplification elements 13a, 13b are deformed in such a way that, in particular, the end regions 18a, 18b are moved away from each other in the longitudinal direction R1. By attaching the amplification elements 13a, 13b to the piezoelectric actuator 11, the latter is also deformed in the longitudinal direction. As a result, an electrical voltage is generated in the piezoelectric actuator 11. This voltage can be detected and in this way an action of force can be inferred. For this purpose, the piezoelectric actuator 11 can be connected to a control element, for example a microcontroller or a control unit of the vehicle, which evaluates the electrical voltages generated at the piezoelectric actuator 11. The piezoelectric actuator 11 can thus be used as a sensor that can detect a force applied by a user.

Furthermore, the piezoelectric component 1 can also be used to generate a haptic signal, as described above. When an electrical voltage is applied to the actuator 11, the piezoelectric actuator 11 deforms in the longitudinal direction R1 and the amplification elements 13a, 13b accordingly perform the described stroke movement. By applying an AC voltage, a vibration can be generated accordingly, which can be transmitted to the tubular section of the control element and perceived by a user.

Figure 4A:
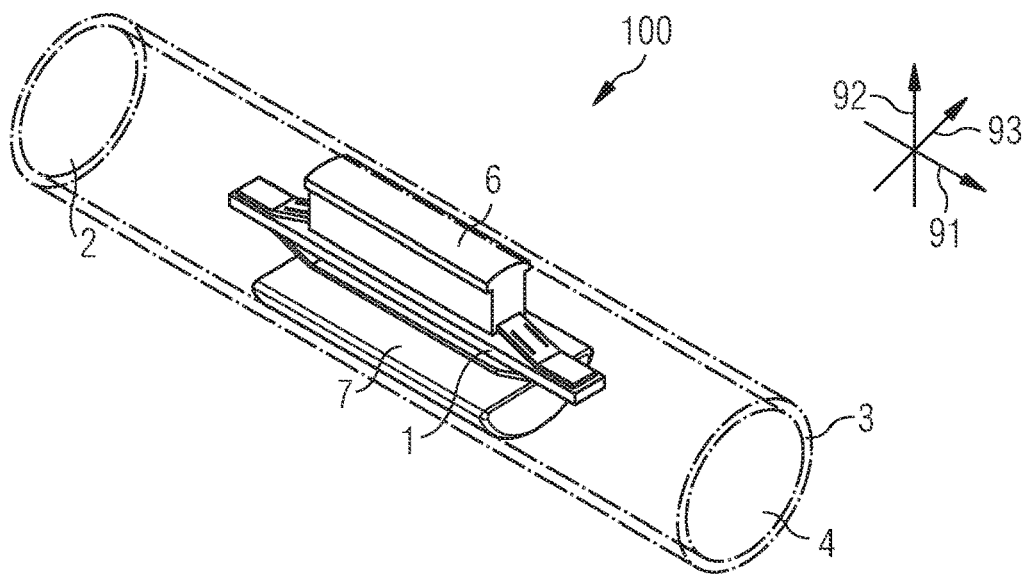
FIG. 4A shows a schematic illustration of a control element in a perspective view according to a further embodiment.
Figure 4B:
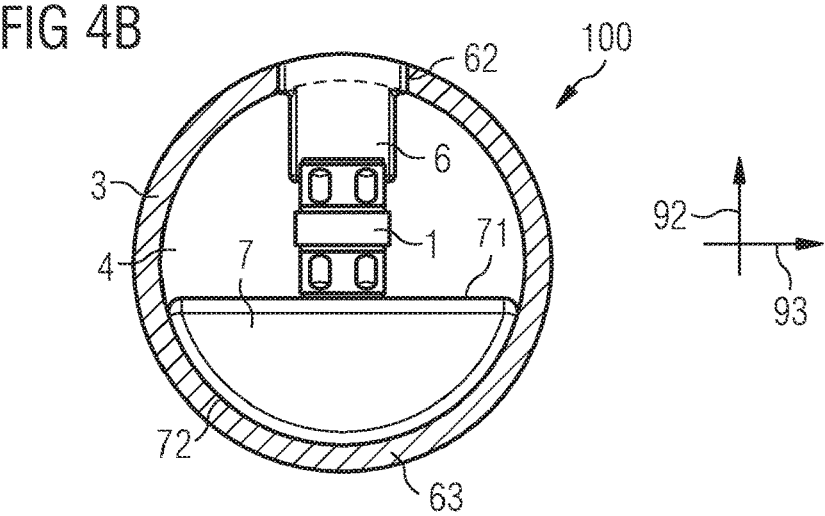
FIG. 4 shows a schematic illustration of the control element of FIG. 4A in a sectional view.
FIG. 4C shows a schematic illustration of the control element of FIG. 4A in another sectional view.
Figure 4C:
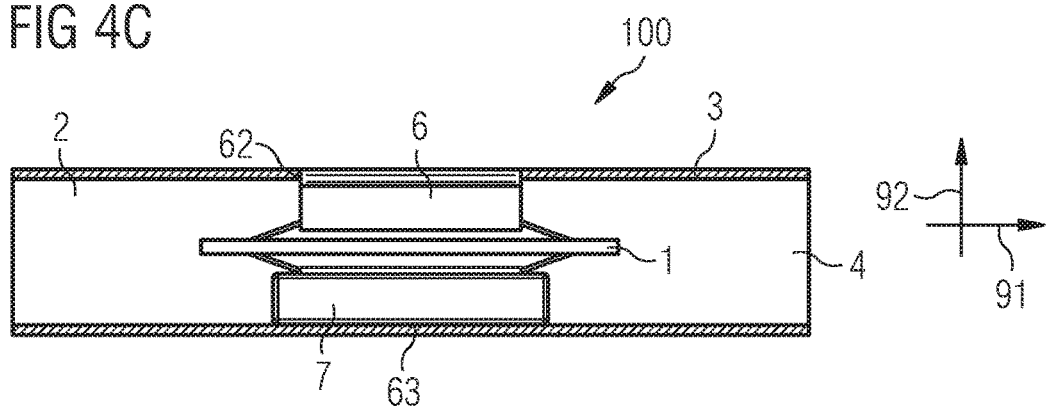

FIGS. 4A to 4C show an embodiment of a control element 100 in which the piezoelectric component 1 described above is used. The control element 100 may, for example, be a control element for a vehicle as described further above. FIGS. 4A to 4C show a perspective view and two sectional views of a part of the control element 100. In particular, the tubular section 2 in which the piezoelectric component 1 is arranged is shown. The tube axis of the tubular section 2 extends in the direction 91 indicated in FIGS. 4A to 4C, and the tube cross-section lies in the plane spanned by directions 92 and 93. A possible handle element mounted on the tubular section 2, such as shown in FIG. 1A, is not shown in FIGS. 4A to 4C or in the following figures for the sake of clarity.

The piezoelectric component 1 is arranged in the tubular section 2 such that the longitudinal direction of the piezoelectric actuator is along the tube axis of the tubular section. In such a longitudinal arrangement, as shown, a piezoelectric component 1 can be used which has a linear expansion much larger than a diameter of the tubular section 2.

Furthermore, the control element 100 comprises at least one interaction element 6 through which a user can cause an action of pressure on the piezoelectric component 1 and/or to which the piezoelectric component 1 can transmit the haptic signal for forwarding to the user. In particular, the piezoelectric component 1 may act on the interaction element 6 by the stroke movement described above. Furthermore, the interaction element can transmit a pressure caused by a user on the interaction element 6 to the piezoelectric component 1 so that the action of pressure can be detected by the piezoelectric component 1 by generating an electrical signal in the piezoelectric component 1. In this case, the interaction element 6 can form a button that can be actuated by the user, by means of which a specific function can be triggered.

In the embodiment shown, the interaction element 6 is in the form of a button or a plunger and is arranged or attached to an amplification element of the piezoelectric component 1. The interaction element is partially arranged in an opening 62 in the wall 3 of the tubular section 2 and extends into the cavity 4. Due to the stroke movement of the piezoelectric component 1, the interaction element 6, which in the rest position prior to the stroke movement may be recessed in the opening or may also be arranged protruding from the opening, can be pressed (further) out of the opening 62 and thus cause a perceptible haptic signal for a user. Conversely, in a rest position, the interaction element 6 may protrude from the opening 62 and be pressable by a user towards the piezoelectric component 1.

The control element 100 further comprises a support element 7 on a side of the piezoelectric component 1 facing away from the interaction element 6. Thus, the piezoelectric component 1 is arranged between the interaction element 6 and a back side region 63 of the wall 3 opposite the interaction element 6, as viewed from the piezoelectric component 1. The support element 7 is thus arranged between the piezoelectric component 1 and the back side region 63 of the wall 3 in the cavity 4 of the tubular section 2. As shown, the support element 7 has a bearing surface 71 for the piezoelectric component 1, with which the piezoelectric component 1 can be supported against the support element 7. On a side opposite to the bearing surface 71, the support element 7 has a support surface 72 which nestles against the back side region 63. The support element 7 allows the stroke movement of the piezoelectric component 1 to be directed completely in the direction of the interaction element 6.

As shown, the tubular section 2 of the control element 100 may have a round, in particular a circular, tubular cross-section. In addition, however, other cross-sectional shapes are also possible, since in particular the shapes of the support element 7 and the interaction element 6 can be easily adapted to other tubular cross-sections.

FIGS. 4A to 4C thus show a unilaterally movable concept of the piezoelectric component 1 within the control element 100, which allows a unilateral use of the actuator movement. In particular, only the interaction element 6 moves against the tubular section 2, while the opposite side is completely blocked in the back side region 63. This leads to the effect that the deflection of the interaction element is maximized. The interaction element 6 and/or the support element 7 can each be with or made of a plastic, preferably a hard plastic, or with or made of a metal, in order to be able to transmit the forces of the piezoelectric component 1 to a user or vice versa as effectively as possible.

In the figures below, directions 91, 92, 93 are also shown for clarity.

As can be seen in FIG. 5 according to a further embodiment, the wall 3 can have an interaction region 31 which forms the interaction element or at which an interaction element 6 described above is arranged within the cavity 4 of the tubular section as shown. In this case, the wall 3 does not have an opening and the transmission of the haptic signal or the action of pressure takes place at least partially via the interaction region 31 of the wall. Thus, the piezoelectric component can exert a force on the interaction region 31 of the wall in the tubular section when the haptic signal is generated, either directly or as shown via the interaction element 6. In this regard, it may be advantageous if the wall 3 has greater mechanical deformability in the interaction region 31 than in other regions so that the interaction region 31 may have sufficient flexibility, for example, to transmit a haptic signal to a user. For example, as indicated, the wall may be thinner in the interaction region 31 than in other regions and/or surrounded by an indentation around the interaction region.

As shown in FIGS. 6 and 7, a plurality of piezoelectric components 1 may also be arranged in the tubular section 2, wherein the piezoelectric components 1 may be the same or different in terms of their technical design and/or functionality. For example, the plurality of piezoelectric components 1 may be arranged side by side to form an array as shown. Each of the piezoelectric components 1 may, for example, be read out and/or controlled separately from the remaining piezoelectric components. This allows different piezoelectric components 1 to perform different functions. Alternatively, several piezoelectric components 1 can be read out or driven together, so that the functionality can be multiplied compared to a single piezoelectric component 1. The piezoelectric components 1 could, for example, be arranged in a partial region of the handle region or also distributed over the handle region. Thus, interactions with a user can be possible at different positions.

As indicated in FIG. 6, the piezoelectric components 1 may be placed in a longitudinal arrangement in the tubular section. As shown in FIG. 7, the piezoelectric components 1 can also be arranged in the tubular section 2 in such a way that the longitudinal direction of the piezoelectric actuators is transverse to the tube axis of the tubular section 2. In this transverse arrangement, several piezoelectric components 1 can be placed close together along the tube axis so that the piezoelectric components can, for example, together simulate the function of a slider.

Figure 8A:
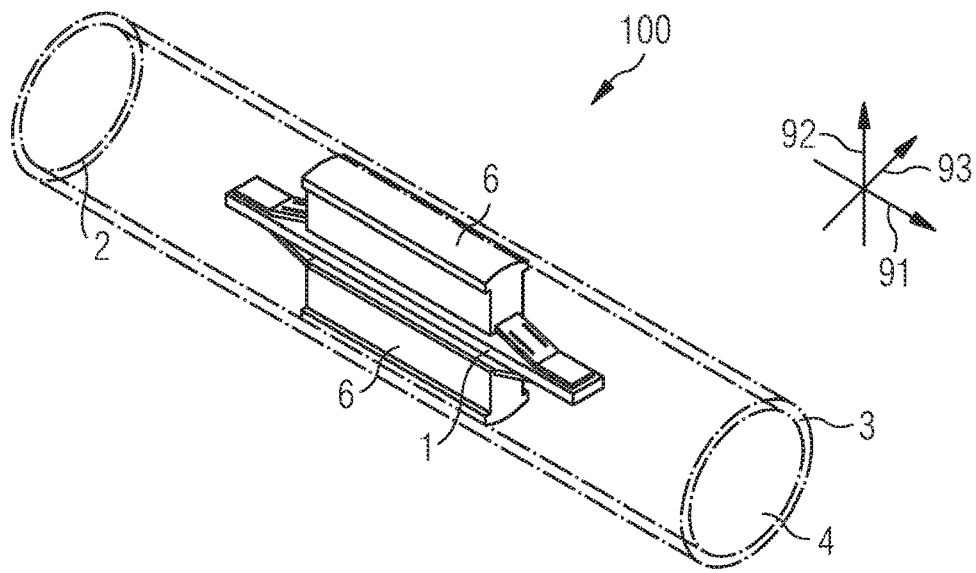
FIG. 8A shows a schematic illustration of a control element in a perspective view according to another embodiment.
Figure 8B:
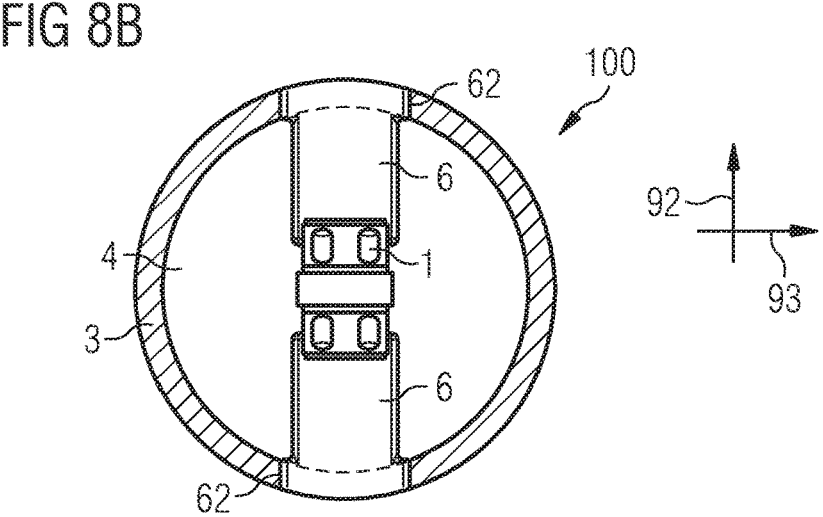
FIG. 8B shows a schematic illustration of the control element of FIG. 8A in a sectional view.
Figure 8C:
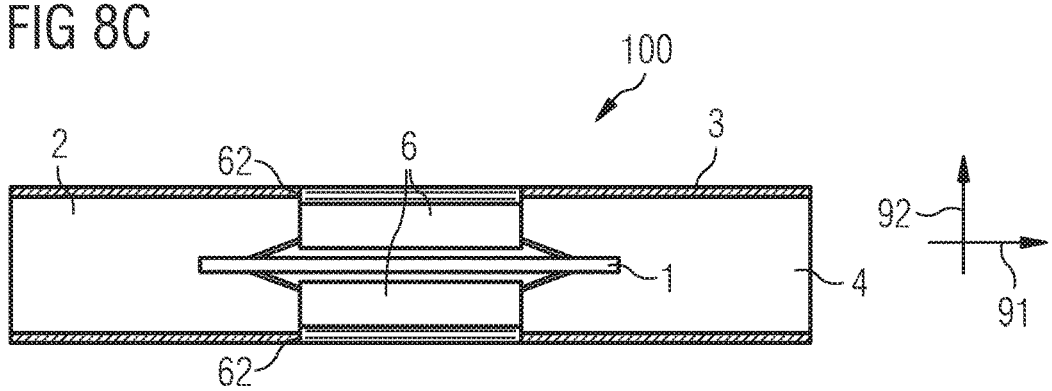
FIG. 8C shows a schematic illustration of the control element of FIG. 8A in another sectional view.

FIGS. 8A to 8C show another embodiment of a control element 100, with views corresponding to those of FIGS. 4A to 4C. Compared to the embodiment of FIGS. 4A to 4C, the piezoelectric component 1 is arranged between two interaction elements 6. The interaction elements 6, each of which is arranged as a button or plunger in a respective opening 62 of the wall 3 as shown, can be arranged radially opposite one another, in particular with respect to the tube cross section. Compared to the embodiment of FIGS. 4A to 4C, this concept allows deflections in opposite directions and thus interaction in both directions with a user.

The features and embodiments described in connection with the figures can be combined with each other according to further embodiments, even if not all combinations are explicitly described. Furthermore, the embodiments described in connection with the figures may alternatively or additionally have further features according to the description in the general part.

The invention is not limited by the description based on the embodiments to these embodiments. Rather, the invention includes each new feature and each combination of features, which includes in particular each combination of features in the patent claims, even if this feature or this combination itself is not explicitly explained in the patent claims or embodiments.

LIST OF REFERENCE NUMERALS 1 piezoelectric component
2 tubular section
3 wall
4 cavity
5 handle element
6 interaction element
7 support element
11 piezoelectric actuator
12 insulation region
13a amplification element
13b amplification element
15 adhesive bond
16 free region
17a, 17b middle region
18a, 18b end region
20a, 20b connection region
21 internal electrode
22 piezoelectric layer
23 outer electrode
62 opening
63 back side region
71 bearing surface
72 support surface
91, 92, 93 direction
100 control element
101 steering rod
102 steering wheel
111 handle region
1000 vehicle
B width
h height
H height L length
R1 longitudinal direction
R2 stroke direction
S stacking direction

We claim:

1. A control element, comprising:
    at least one tubular section with a cavity at least partially surrounded by a wall; and
    a piezoelectric component arranged in the cavity, the piezoelectric component being configured to generate a haptic signal in at least a partial region of the control element and to detect an action of pressure on at least a part of the piezoelectric component, the piezoelectric component further comprising:
    a piezoelectric actuator having a longitudinal direction; and
    at least one mechanical amplification element attached to the piezoelectric actuator such that a change in length of the piezoelectric actuator along the longitudinal direction, when a voltage is applied, moves a portion of the at least one mechanical amplification element in a direction perpendicular to the longitudinal direction, and when no voltage is applied, the action of pressure deforms the at least one mechanical amplification element to cause the length of the piezoelectric actuator to change, thereby generating an electrical signal that triggers a predefined function by the control element.

2. The control element according to claim 1, wherein the control element comprises a steering rod or a steering wheel for a vehicle comprising the tubular section.

3. The control element according to claim 1, wherein the control element comprises at least one interaction element by which a user can cause an action on the piezoelectric component and/or on which the piezoelectric component can generate the haptic signal.

4. The control element according to claim 3, wherein the interaction element is arranged at least partially in an opening in the wall.

5. The control element according to claim 3, wherein the wall has an interaction region which forms the interaction element or on which the interaction element is arranged, and the wall has a greater mechanical deformability in the interaction region than in other regions.

6. The control element according to claim 3, wherein the piezoelectric component is arranged between the interaction element and a back side region of the wall opposite the interaction element as viewed from the piezoelectric component, and a support element is arranged in the cavity between the piezoelectric component and the back side region of the wall.

7. The control element according to claim 3, wherein at least one interaction element includes two interaction elements, the piezoelectric component is arranged between the two interaction elements.

8. The control element according to claim 1, wherein at least the tubular section of the control element comprises a metal.

9. The control element according to claim 1, wherein the control element comprises a handle element which surrounds the tubular section with the piezoelectric component and which comprises a plastic which is softer than the wall of the tubular section.

10. The control element according to claim 1, wherein the piezoelectric component is arranged in the tubular section such that the longitudinal direction of the piezoelectric actuator runs along a tube axis of the tubular section.

11. The control element according to claim 1, wherein the piezoelectric component is arranged in the tubular section such that the longitudinal direction of the piezoelectric actuator is transverse to a tube axis of the tubular section.

12. The control element according to claim 1, further including at least a second piezoelectric component that is arranged in the tubular section.

13. A vehicle comprising a control element according to claim 1.

14. The vehicle of claim 13, wherein the vehicle is a motorcycle.

* * * * *